(12) United States Patent
Royer, Jr. et al.

(10) Patent No.: US 7,085,878 B2
(45) Date of Patent: Aug. 1, 2006

(54) TRANSPORTATION OF MAIN MEMORY AND INTERMEDIATE MEMORY CONTENTS

(75) Inventors: Robert J. Royer, Jr., Portland, OR (US); John I. Garney, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/861,718

(22) Filed: Jun. 4, 2004

(65) Prior Publication Data

US 2004/0225826 A1 Nov. 11, 2004

Related U.S. Application Data

(63) Continuation of application No. 09/963,185, filed on Sep. 25, 2001, now abandoned.

(51) Int. Cl.
*G06F 12/00* (2006.01)

(52) U.S. Cl. ........................ 711/101; 711/118; 711/152; 711/156; 702/220

(58) Field of Classification Search ................ 702/119; 709/220; 711/101, 118, 152, 156, 161, 165, 711/170; 713/1, 100; 714/7, 13, 15, 23, 714/24
See application file for complete search history.

(56) References Cited

U.S. PATENT DOCUMENTS

| | | | |
|---|---|---|---|
| 5,175,842 A * | 12/1992 | Totani | 711/161 |
| 5,193,162 A * | 3/1993 | Bordsen et al. | 711/152 |
| 5,328,278 A * | 7/1994 | Kokubo | 400/74 |
| 5,386,552 A | 1/1995 | Garney | |
| 5,586,291 A * | 12/1996 | Lasker et al. | 711/113 |
| 5,742,742 A * | 4/1998 | Ueda | 358/1.9 |
| 5,778,167 A * | 7/1998 | Carrel et al. | 714/8 |
| 6,012,983 A | 1/2000 | Walker et al. | |
| 6,055,180 A | 4/2000 | Gudesen et al. | |
| 6,101,576 A | 8/2000 | Kobayashi et al. | |
| 6,295,577 B1 * | 9/2001 | Anderson et al. | 711/113 |
| 6,470,424 B1 | 10/2002 | Adams | |
| 6,493,806 B1 | 12/2002 | Royer, Jr. et al. | |
| 6,539,456 B1 | 3/2003 | Stewart | |
| 6,564,286 B1 * | 5/2003 | DaCosta | 711/103 |
| 6,618,751 B1 * | 9/2003 | Challenger et al. | 709/213 |
| 6,693,717 B1 * | 2/2004 | Teradaira et al. | 358/1.14 |
| 6,854,000 B1 * | 2/2005 | Ikegami et al. | 707/203 |
| 2002/0033888 A1 * | 3/2002 | Yamagami | 348/232 |
| 2002/0154178 A1 * | 10/2002 | Barnett et al. | 345/853 |
| 2002/0157089 A1 * | 10/2002 | Patel et al. | 717/178 |
| 2003/0005223 A1 | 1/2003 | Coulson et al. | |
| 2003/0046493 A1 | 3/2003 | Coulson | |

OTHER PUBLICATIONS

Lang, Sidney B., "Pyroelectric Applications of Ferroelectric Polymers", CH2593-2/88/0000-0251, IEEE 1988 (pp. 251-254).

Date, M.; Furukawa, T.; Yamaguchi, T.; "Opto-Ferroelectric Memories Using Vinylidene Fluorode Copolymers," The Institute of Physical and Chemical Research, Wako, Saitama 351-01, Japan; Ricoh Co. Ltd., Kouhoku, Yokohama 223, Japan (pp. 298-302).

* cited by examiner

*Primary Examiner*—Christian P. Chace
(74) *Attorney, Agent, or Firm*—Johnson & McCollom, P.C.

(57) ABSTRACT

A nonvolatile memory module. The module includes a nonvolatile memory array and a connector allowing the array to make connection with a host system. A memory controller operates to either create an image of a nonvolatile intermediate memory in response to an imaging request or populate a nonvolatile intermediate memory in response to an installation request.

17 Claims, 3 Drawing Sheets

TRANSPORTATION OF MAIN MEMORY AND INTERMEDIATE MEMORY CONTENTS

This application is a continuation of prior application Ser. No. 09/963,185 filed Sep. 25, 2001, which is now abandoned.

BACKGROUND

1. Field

This disclosure relates to intermediate memory systems, more particularly to those using nonvolatile memory.

2. Background

Intermediate memory has several useful applications. For example, a personal computer uses a cache memory to store frequently accessed data in a faster memory than that used for the main memory. Similarly, placing frequently used data in a smaller memory saves time in seeking and reading the data from a larger memory.

Other types of intermediate memory are used as well. For example, portable electronic devices that communicate with a computer or workstation may use the hard disk of the computer as its main memory. They use the local memory in the device as an intermediate storage. Similarly, in a distributed computing environment, each workstation connected to the central server or repository may have a local storage to avoid having to transport the same data across the network unnecessarily.

In many applications, the local store is a volatile memory that does not retain its data upon loss of power. However, it is possible to use nonvolatile memory, allowing retention of the data in the intermediate storage. Currently, no known systems make any effort to create or store images of the intermediate storage. However, this ability would provide several advantages for manufacturers of electronic devices, among others.

BRIEF DESCRIPTION OF THE DRAWINGS

The invention may be best understood by reading the disclosure with reference to the drawings, wherein.

DETAILED DESCRIPTION OF THE EMBODIMENTS

Several examples of use of intermediate memory exist. Intermediate storage or memory, terms that will be used interchangeably here, is used in computers, distributed computing environments, a wide range of consumer electronic devices, among many others. For ease of discussion and to promote understanding of the invention, however, an initial example of a computer using a cache memory as the intermediate memory will be used. This is not intended to limit application of the invention or the scope of the claims in any way.

Figure 1:
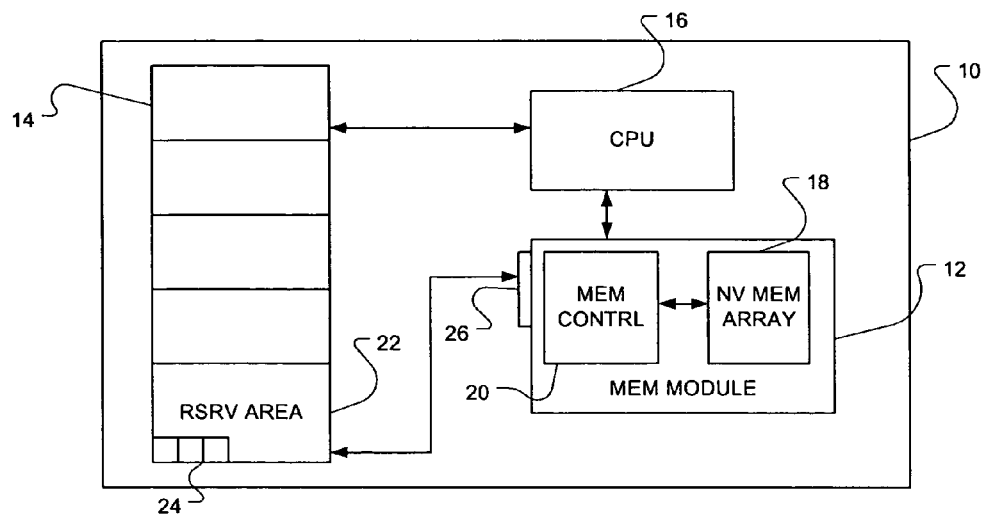
FIG. 1 shows one embodiment of an electronic device having a nonvolatile intermediate memory module, in accordance with the invention.

Turning now to FIG. 1, it can be seen that a host system 10 has a central processing unit 16, a main memory 14, and an intermediate memory module 12. Intermediate memory module 12 may have a dedicated memory controller 20. Alternatively, the central processing unit or other processor in the system may act as the memory controller. The memory module also includes a nonvolatile (NV) memory array 18. The memory module may be a separate device from the CPU, as shown here, or it may reside coincident with the CPU. Similarly, the nonvolatile memory array may reside coincident with the memory controller, or reside separately from the memory controller.

Figure 2:
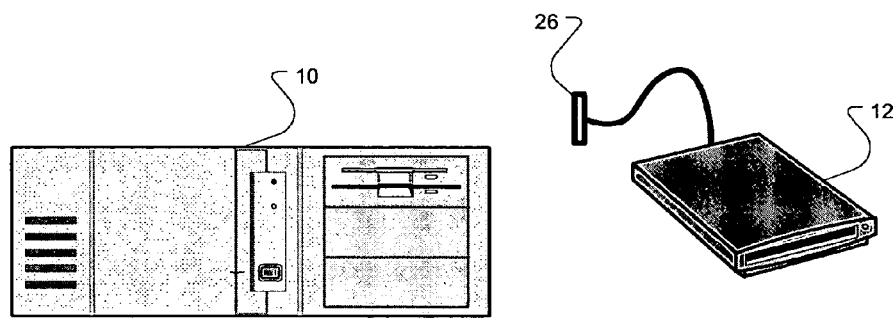
FIG. 2 shows an alternative embodiment of a nonvolatile intermediate memory module, in accordance with the invention.

For a memory array or controller that resides separately, the connector 26 may be a back plane connector. For those residing coincident with the CPU, the connector 26 may comprises a trace line on a printed circuit board. An alternative embodiment is shown in FIG. 2, wherein the memory module 12 is contained in an external chassis to the host system 10. The connector 26 allows connection between the host system 10 and the memory module 12. Again, the memory controller may be a dedicated controller in the chassis, or the central processing unit or other system processor may assume the function of a memory controller when the memory module 12 is connected.

The nonvolatile memory array 18 that is part of memory module 12 may be any type of persistent memory, one that retains its contents even after loss of power. A particularly well-suited memory technology for the context of this invention is polymer ferroelectric memory arrays. Generally, this type of memory comprises a layer of polymer material having ferroelectric properties sandwiched between layers of metal. The layers of metal are patterned to define word lines and bit lines as are commonly used in addressing memory cells. The region of polymer between the word line and bit line cross over points become the memory cells. Manipulation of the voltages on the word lines and bit lines can causes changes in the polarization state of the ferroelectric polymer, with one state being defined as a data '1' and the opposite polarization state being defined as a data '0.'

The polymer ferroelectric memories generally do not require separate circuits of transistors for each cell. Therefore, they are simpler to manufacture, as well as denser in population. This provides a large capacity, nonvolatile memory array that is not very expensive. Other types of nonvolatile memory are also within the scope of the invention, including volatile memory with a battery backup, as the battery will prevent the memory from losing its contents when the main power is turned off. Such a large, nonvolatile memory array provides opportunities in management of memory in various types of system that were not previously available.

This can be seen using the example of a computer using cache memory as an intermediate storage. When most computers are manufactured, the manufacture images a 'gold' image of the main memory, typically a disk drive. However, no current techniques or apparatuses exist that allow a 'gold' image of a cache memory to be made. Generally, a cache memory only reaches true effectiveness after the system has been used for an extensive period of time.

The effectiveness of cache memory in the computer example lies in its ability to allow the CPU to avoid having to access the main memory. The main memory is larger and requires more seeking prior to locating the data for which the CPU is looking. Many main memory technologies are also slower than those memories used for cache memory. This increases the amount of time needed to satisfy each request, slowing the overall processing speed of the system and reducing the efficiency. Many different techniques exist in which the cache memory is populated with frequently used data, and analyses are run to bring data with a high probability of access to the cache memory.

In one application of the invention, the memory controller of FIG. 1 may create an image of the nonvolatile intermediate memory or cause the nonvolatile intermediate memory to be populated. For example, once a manufacturer has obtained a populated cache memory in a demonstration or test machine, the system may make a copy of the cache onto the main storage. This copy may be used for many purposes.

Among those may be methods to copy the cache image onto unpopulated cache memories of other systems being manufactured. This provides the new systems with a populated cache memory, increasing the effectiveness of the new system right off the factory floor. Other applications may be in restoration of a system to a known cache state, such as for those systems used in testing and debugging of programs. With the 'gold' cache image contained within the 'gold' main memory image, the ability to replicate the cache contents on the manufacturing floor becomes relatively simple. For example, a driver could be included as part of the operating system that checks the main memory to determine if a copy of the cache resides within. As will be discussed later with reference to FIGS. 3 and 4, a designator may be used that will serve to notify the memory controller as to the location from which the cache contents should first be accessed.

Figure 3:
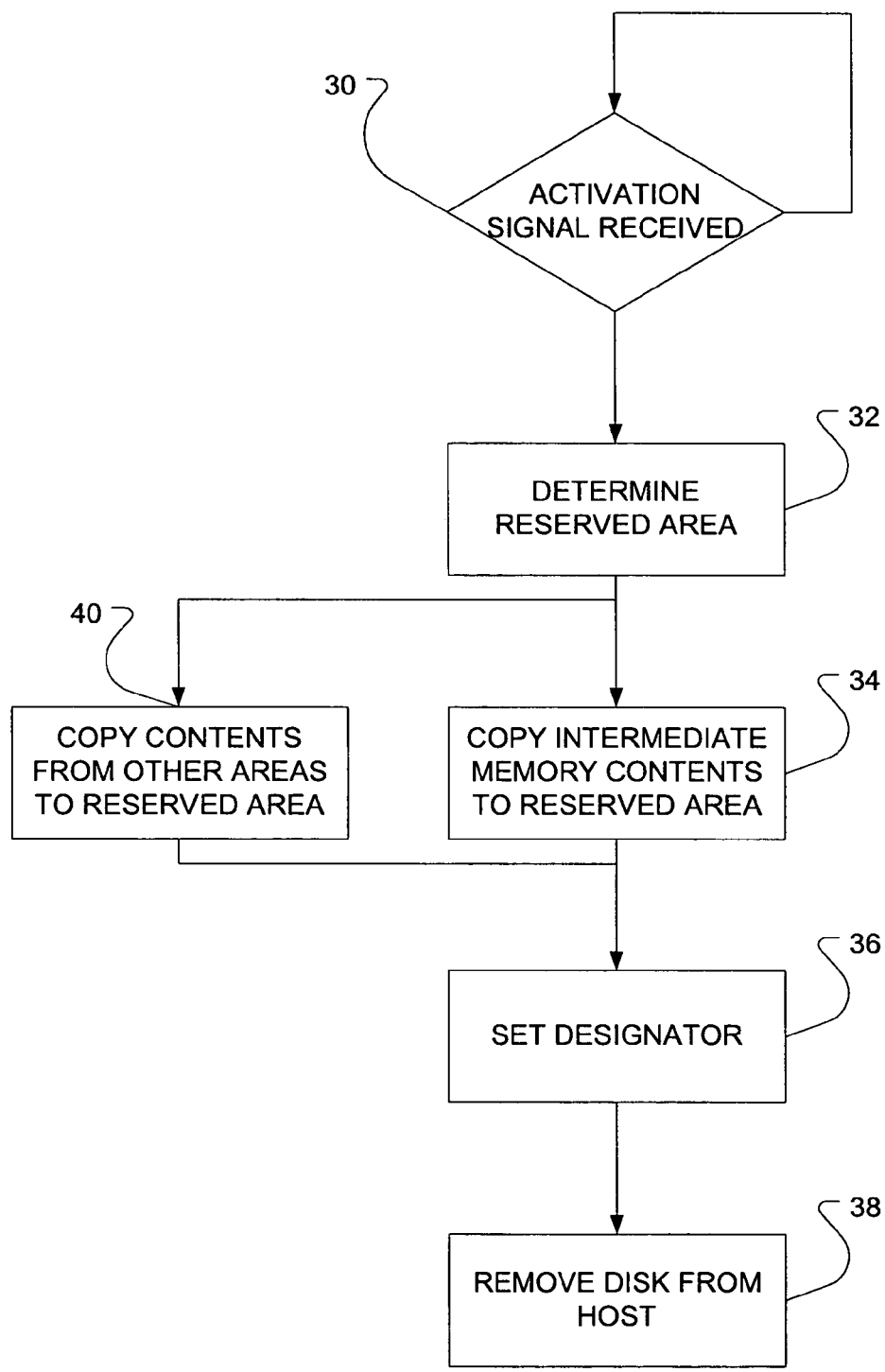
FIG. 3 shows one embodiment of a method to create an image of an intermediate memory, in accordance with the invention.

Referring now to FIG. 3, one embodiment of a method to create an image of an intermediate memory will be discussed. At 30, an activation signal will be received. The activation signal indicates that a copy of the nonvolatile intermediate memory contents should be made. Generally, the activation signal will be some sort of shut down signal, or a signal indicating that no further changes to the memory are to be made. This avoids any changes being made to the intermediate memory contents during the copying of those contents.

A reserved area of the main memory is designated at 32. An example of a reserved area is shown at 22 of FIG. 1. The contents of the reserved area will not be moved to intermediate storage. In the personal computer example, the reserved area will not be 'cached.' Again, this prevents changes being made to both the intermediate memory and the main memory. The reserved area may be designated at manufacture of the machine, during system initialization, periodically throughout system operation or each time the imaging process is initiated. For those instances where the reserved area is already designated, determining the reserved area will comprise accessing that area in preparation for transfer of data.

Returning to FIG. 3 at 34, the contents of the intermediate memory are copied to the reserved area. In an alternative embodiment, it may be desirable to copy other parts of the main memory to the reserved area as shown at 40. This may occur in any situation in which it is desirable to recreate a portion of the main memory to a known state. This is an optional step.

The designator discussed above is set at 36. The state of the designator is changed to indicate that the host system should access the intermediate storage contents from the main memory initially, instead of accessing the intermediate storage directly. This process will be discussed in more detail with reference to FIG. 4. The designator may comprise many different types of indicators. In the example of FIG. 1, the designator is at least one bit stored in the reserved area of the main storage at 24.

The designator may be stored just about anywhere. However, in the computer manufacturing example above, if the main memory is removed from the current host system and installed in another host system to populate the other host system's cache, the designator would have to be resident on the other host. Otherwise, the new host would not detect the designator and would not access the copy of the intermediate memory residing on the main memory at system initialization. Removal of the main memory from the host is an option shown at 38.

Figure 4:
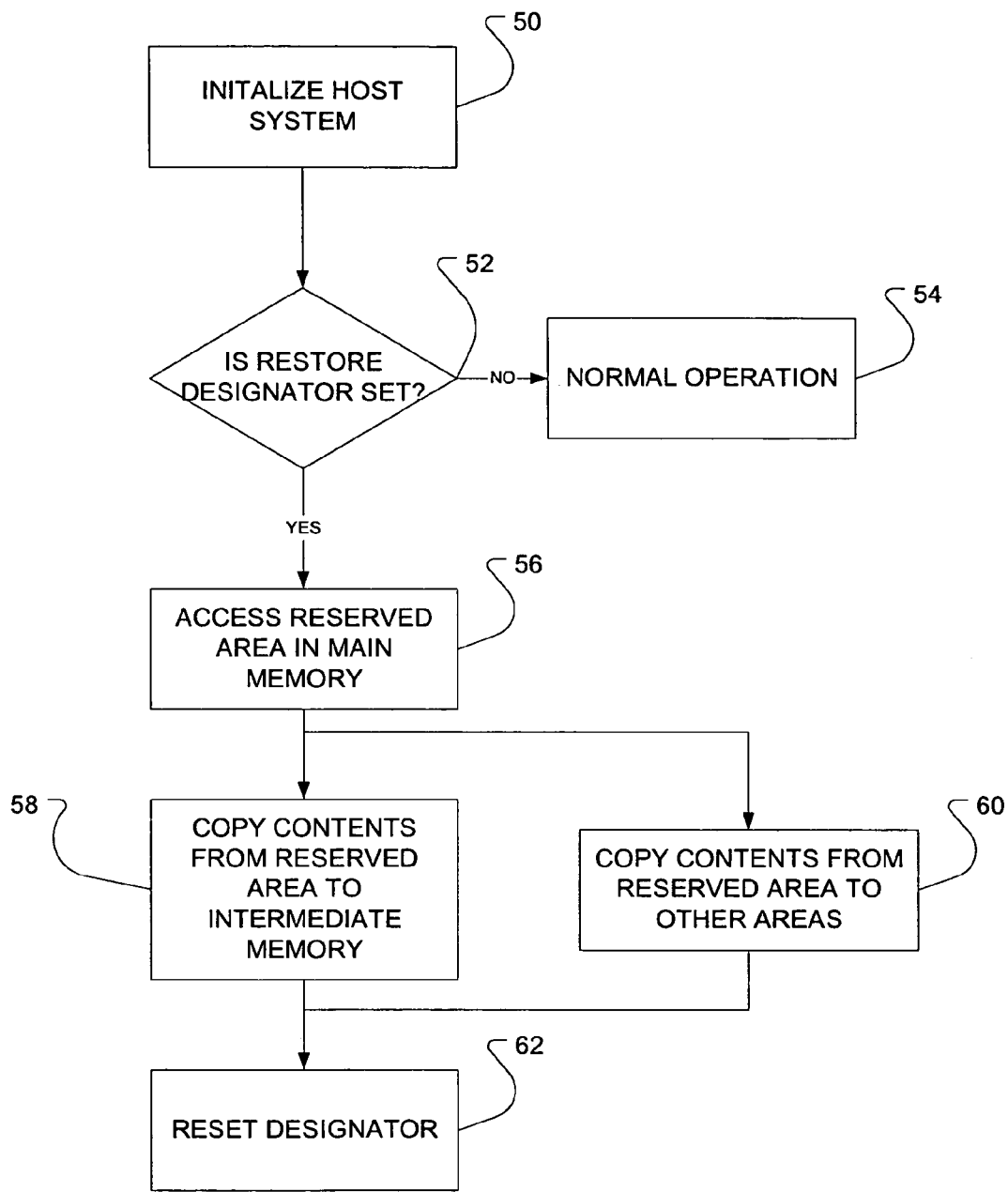
FIG. 4 shows one embodiment of a method to populate an intermediate memory, in accordance with the invention.

Once a copy of a populated intermediate storage exists, it is possible to replicate it or use it to restore systems. An embodiment of this is shown in FIG. 4. For purposes of discussion here, this replication or restoration process will be referred to as an installation. The copy of the intermediate memory is being installed in either the same intermediate memory, or another intermediate memory. Typically, this process will occur at initialization of the host system.

In FIG. 4, the initialization of the host system occurs at 50. The host system detects whether or not the designator, discussed above, indicates that an installation should occur at 52. If the designator is not selected, the system operates 'normally' at 54. If it does indicate an installation should occur, the host system accesses a reserved area in the host system main memory at 56. The contents of the reserved area are then copied to the intermediate memory at 58. As mentioned above, if desired, some of the contents of the reserved area may pertain to other areas of the main memory. If so, those contents are copied back to the other areas at 60. Finally, the install designator is reset or cleared at 62. This is usually accomplished by setting the predetermined number of bits to a different state, where the different state indicates that the installation from main memory to intermediate memory does not need to occur.

Typically, these processes will be implemented by software in the host system. For example, a driver resident on the new host system may be the entity that determines the state of the designator or flag that indicates whether an install should occur. Similarly, a driver resident on the host system may also initiate the imaging process that results in the contents of the intermediate storage being copied to the main storage upon activation.

If the methods of the invention are implemented in software, that software will typically comprise machine-readable code that implement the methods of the invention when that code is executed. The code may be contained in some type of article, such as a diskette or compact disc. Similarly, it may be contained in a downloadable file.

In this manner, systems using intermediate memory will have the capacity to have a 'pre-warmed' intermediate memory upon system initialization. This avoids the delays that typically occur while the intermediate storage is populated enough to increase system efficiency.

Thus, although there has been described to this point a particular embodiment for a method and apparatus for transporting of main and intermediate memory contents, it is not intended that such specific references be considered as limitations upon the scope of this invention except in-so-far as set forth in the following claims.

What is claimed is:

1. A nonvolatile memory module, comprising:
   a polymer, ferroelectric, nonvolatile memory array external to a host system;

a connector operable to connect the nonvolatile memory array to the host system; and a memory controller operable to:
  determine a reserved area in a main memory, wherein the reserved area is an area having contents that are prevented from being moved to intermediate memory after reception of an activation signal;
  copy contents of the intermediate memory to the reserved area; and
  populate the nonvolatile memory from the reserved area of the main memory in response to an installation request.

2. The nonvolatile memory module of claim 1, the memory controller to create an image of the nonvolatile memory to a reserved area of a main memory in a second host system in response to an activation signal.

3. The nonvolatile memory module of claim 1, wherein the memory controller further comprises a dedicated memory controller.

4. The nonvolatile memory module of claim 1, wherein the memory controller further comprises a central processing unit on the host system acting as a memory controller.

5. The nonvolatile memory module of claim 1, wherein the memory controller is further operable to change a state of a designator based upon the completion of one of either creation of the image or the installation request.

6. The nonvolatile memory module of claim 1, wherein the nonvolatile memory array resides coincident with the memory controller.

7. The nonvolatile memory module of claim 1, wherein the nonvolatile memory array resides separately from the memory controller.

8. A method of creating an image of an intermediate memory, the method comprising:
  receiving an activation signal from a host system indicating that no further changes to a polymer, ferroelectric, nonvolatile memory are to be made;
  determining a reserved area on a main memory device in the host system, wherein the reserved area has contents that are prevented from being moved to intermediate storage after reception of the activation signal;
  copying contents of the polymer, ferroelectric, nonvolatile memory to the reserved area;
  removing the main memory from the host system; and
  transporting the main memory and inserting it into a second host.

9. The method of claim 8, the method comprising changing a state of a designator to a state that indicates a copy of nonvolatile memory exists in the reserved area.

10. The method of claim 8, wherein the method further comprises making copies of at least one area, other than the reserved area, of the main memory to the reserved area.

11. The method of claim 8, wherein determining a reserved area further comprises accessing a predetermined area.

12. The method of claim 8, wherein determining a reserved area further comprises designating an area of the main memory as the reserved area.

13. The method of claim 9, wherein changing the state of a designator further comprises setting a predetermined number of bits to a predetermined state.

14. The method of claim 13, wherein the predetermined number of bits reside in the reserved area.

15. An article containing machine-readable code that, when executed, causes a machine to:
  receive an activation signal from a host system indicating that no further changes to a polymer, ferroelectric, nonvolatile memory are to be made;
  determine a reserved area on a main memory device in the host system, wherein the reserved area has contents that are prevented from being moved to the nonvolatile memory after reception of the activation signal;
  copy contents of the polymer, ferroelectric memory to the reserved area;
  removing the main memory from the host system; and
  transporting the main memory and inserting it into a new host system.

16. The article of claim 15, the article containing code, that when executed, causes the machine to change a state of a designator to a state that indicates a copy of the polymer, ferroelectric memory exists in the reserved area.

17. The article of claim 15, wherein the article contains further code that, when executed, causes the machine to make copies of at least one area of the main memory, other than the reserved area, to the reserved area.

* * * * *